(12) United States Patent
Campbell et al.

(10) Patent No.: US 7,766,750 B2
(45) Date of Patent: Aug. 3, 2010

(54) SLIP CLUTCH

(75) Inventors: Geoffrey George Campbell, Kensington (AU); Hugh Lithgow Stark, Kareela (AU)

(73) Assignee: JLG Industries, Inc., McConnellsburg, PA (US)

( * ) Notice: Subject to any disclaimer, the term of this patent is extended or adjusted under 35 U.S.C. 154(b) by 351 days.

(21) Appl. No.: 11/581,781

(22) Filed: Oct. 17, 2006

(65) Prior Publication Data

US 2008/0090664 A1 Apr. 17, 2008

(51) Int. Cl.
*F16D 7/02* (2006.01)
(52) U.S. Cl. .............................. 464/10; 192/150; 464/47
(58) Field of Classification Search .................... 464/10, 464/47, 46, 48; 29/460; 192/18 R, 34, 150; 188/71.5, 166, 265; 81/474–476; 173/5
See application file for complete search history.

(56) References Cited

U.S. PATENT DOCUMENTS

| | | | |
|---|---|---|---|
| 460,647 A | 10/1891 | Mills | |
| 788,992 A | 5/1905 | Bauer | |
| 1,425,305 A * | 8/1922 | White | 464/10 |
| 1,731,064 A * | 10/1929 | Spase | 192/18 R |
| 2,429,561 A * | 10/1947 | Miller | 464/10 X |
| 2,655,015 A * | 10/1953 | Linder | 464/48 X |
| 2,727,372 A | 12/1955 | Haerther | |
| 3,025,686 A * | 3/1962 | Lewis | 464/10 |
| 3,115,211 A | 12/1963 | Ostrander, Jr. | |
| 3,214,773 A | 11/1965 | Benjamin et al. | |
| 3,398,611 A * | 8/1968 | Hahner | 81/474 |
| 3,737,007 A | 6/1973 | Herrell | |
| 3,752,263 A | 8/1973 | Thevenot | |
| 4,049,081 A | 9/1977 | McDonald et al. | |
| 4,183,423 A | 1/1980 | Lewis | |
| 4,194,591 A | 3/1980 | Fisher | |
| 4,427,094 A | 1/1984 | Winkelblech | |
| 4,512,440 A | 4/1985 | Bixby | |
| 4,592,447 A | 6/1986 | Ream et al. | |
| 5,044,473 A | 9/1991 | Gripe | |
| 6,095,284 A | 8/2000 | Smith | |
| 6,471,004 B2 | 10/2002 | Stringer et al. | |
| 7,004,284 B2 * | 2/2006 | Chick | |

FOREIGN PATENT DOCUMENTS

| | | |
|---|---|---|
| DE | 27 00 812 | 7/1978 |
| EP | 0 192 170 | 8/1986 |
| GB | 1 492 543 | 11/1977 |
| GB | 2 211 237 | 6/1989 |

* cited by examiner

*Primary Examiner*—Greg Binda
(74) *Attorney, Agent, or Firm*—Nixon & Vanderhye P.C.

(57) ABSTRACT

A slip clutch acts between a shaft and a housing. The slip clutch includes an oil reservoir within the housing and one or more slipping surfaces disposed in the oil reservoir that are keyed to the shaft and possibly alternately to the housing. The slipping surfaces may include stacked plates or washers. Each of the washers includes an oil groove or other structure on one surface thereof that maintains a consistent film of oil on the washer surfaces. The stacked washers slip relative to one another such that the shaft rotates relative to the housing upon an application of torque that exceeds a predetermined torque.

10 Claims, 3 Drawing Sheets

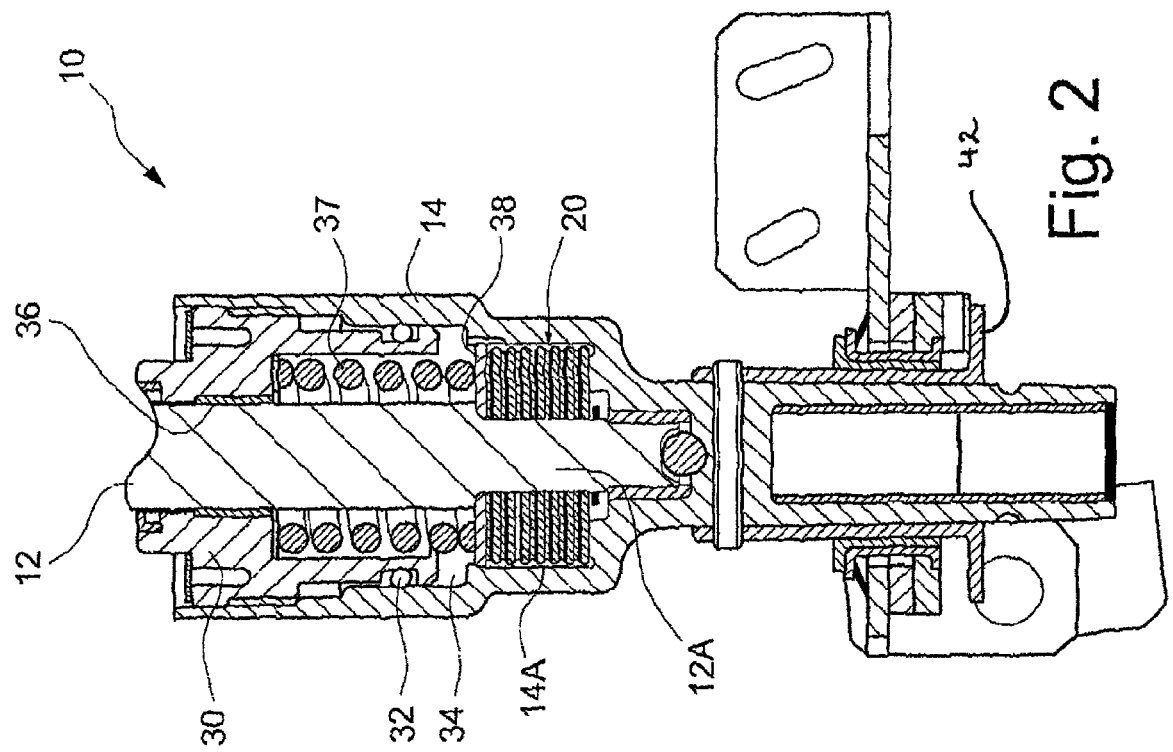
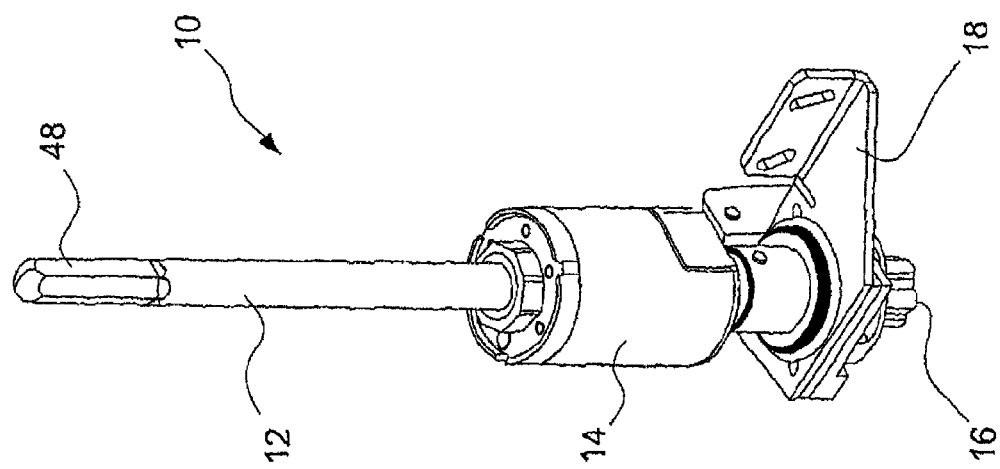

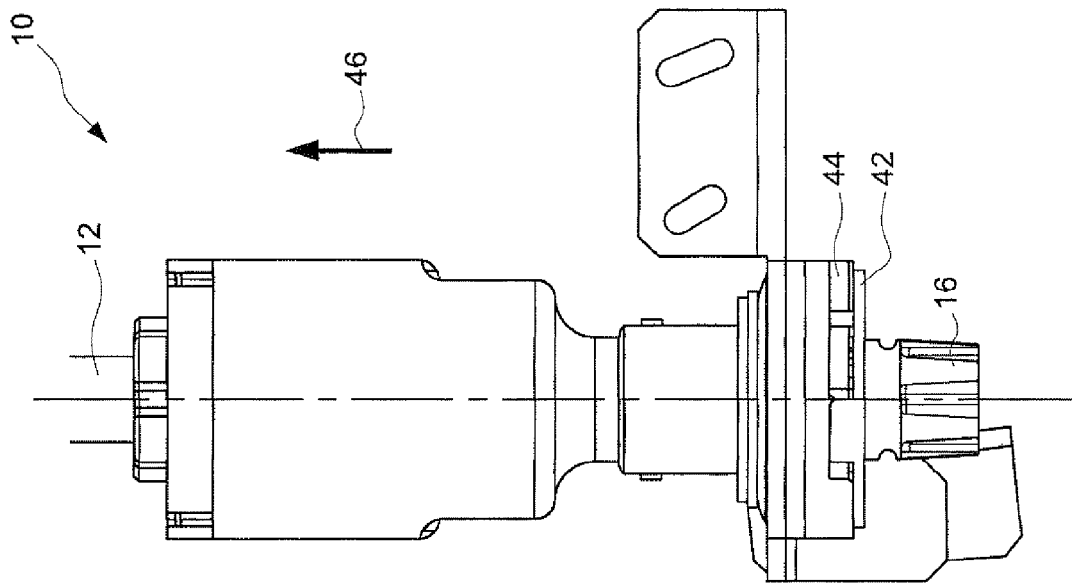
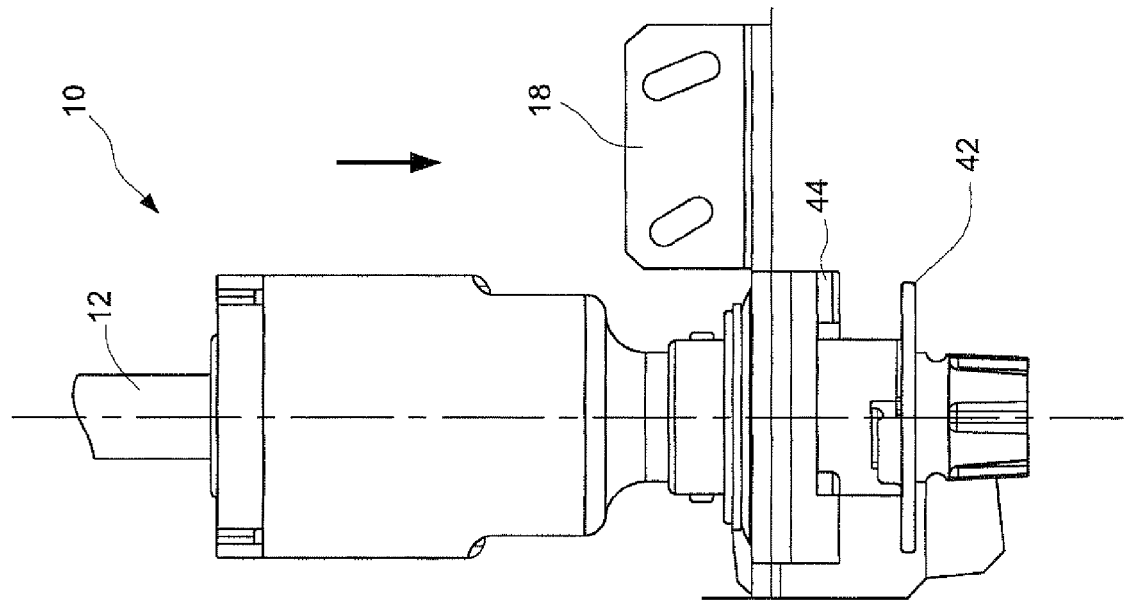

SLIP CLUTCH

CROSS-REFERENCES TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

The invention relates to a slip clutch and, more particularly, to a slip clutch including components having at least one slipping surface that results in a lightweight and consistent overload clutch assembly.

There exist known structures to act as an overload clutch between two members, such as a rotating shaft and a housing. A clutch typically serves to prevent an excessive load on one part or the other by permitting the shaft and housing to slip relative to each other upon the application of excessive torque.

In most applications, it is important that activation of the clutch occurs consistently. Moreover, the clutch must be robust to endure normal use. One known clutch arrangement utilizes a slipping plate or the like set on ball bearings. During regular use, however, the ball bearings tend to fracture, eventually requiring replacement of the clutch. Moreover, conventional designs are typically formed of heavier materials, which can be a concern if total weight of the device in which the clutch is installed is an important design consideration.

In activating drive functions in industrial vehicles and the like, ANSI (American National Standards Institute) standards require two independent actions. For example, in an aerial work platform, a user may be required to both press and hold an activation switch or the like and operate a controller to effect movement of the platform.

Higher end hand-held power drills are capable of producing sufficient torque to provide drive power for various industrial vehicle functions including for example drive, lift, etc. Additionally, the battery life of drills is expanding with advancing battery technology. Power drills, however do not satisfy ANSI standards, since only a single action of activating the trigger is required to power the drill.

BRIEF SUMMARY OF THE INVENTION

The slip clutch described herein utilizes lightweight materials of a simple construction that provides consistent and accurate activation upon the application of a torque exceeding a predetermined torque. Although the slip clutch described herein has broad applications, an exemplary application is for use with a mast lifting apparatus including an operator platform that can be raised and lowered on a mast. In the exemplary application, the shaft and housing are rotated by a source of motive power such as a hand-held power drill or the like to drive a worm gear assembly, which in turn rotates a drum to lift the platform on the mast. If the platform reaches its topmost position or becomes stuck in any manner, the application of torque by the source of motive power will exceed an allowable limit, which will thereby activate the clutch described herein to prevent damage to the lifting components.

In order to utilize a hand-held power drill as a source of motive power, it is necessary to satisfy ANSI requirements with regard to two independent actions. The shaft cooperable with the clutch assembly described herein includes a fitting for receiving a drill bit, and the shaft and clutch assembly are configured such that two independent actions are required to activate the drive system. For example, a first action may be to press/hold down the shaft, and a second action may be to activate the drill.

In an exemplary embodiment of the invention, a slip clutch acts between a shaft and a housing. The slip clutch includes an oil reservoir within the housing and a plurality of stacked washers disposed in the oil reservoir and being alternately keyed to the shaft and the housing. Each of the washers includes an oil groove or a plurality of oil grooves on one surface thereof, where the oil grooves maintain a consistent film of oil on the washer surfaces. The stacked washers slip relative to one another such that the shaft rotates relative to the housing upon an application of a predetermined torque. The slip clutch may additionally include a compression spring disposed within the housing that acts to maintain a minimum compression force on the stacked washers. A cap member may be secured in the housing, which includes a central opening therein receiving the shaft. The compression spring is preferably disposed surrounding the shaft between the cap member and the stacked washers. The cap member may be threaded in the housing, where the predetermined torque is adjustable according to a position of the cap member relative to the housing. Alternatively or additionally, the predetermined torque is adjustable according to a number of washers in the stacked washers.

In another exemplary embodiment of the invention, a slip clutch includes a first plurality of washers connected to the shaft and a second plurality of washers connected to the housing. The first and second pluralities of washers are immersed in an oil bath within the housing, and the washers comprise structure that maintains a consistent film of oil thereon.

In yet another exemplary embodiment of the invention, a slip clutch includes at least one slipping surface disposed against a surface of the housing and keyed to the shaft, and a biasing mechanism urging the slipping surface into contact with the housing surface. The slipping surface is immersed in an oil bath within the housing.

In still another exemplary embodiment of the invention, a method for preventing a torque overload with a slip clutch acting between a shaft and a housing includes the steps of stacking a first plurality of washers connected to the shaft together with a second plurality of washers connected to the housing; immersing the first and second pluralities of washers in an oil bath; and maintaining a consistent film of oil on washer surfaces, wherein the stacked washers slip relative to one another such that the shaft rotates relative to the housing upon an application of a predetermined torque.

BRIEF DESCRIPTION OF THE DRAWINGS

These and other aspects and advantages of the present invention will be described in detail with reference to the accompanying drawings, in which:

FIG. 1 is a perspective view of the clutch assembly described herein;

FIG. 2 is a cross-sectional view of the clutch assembly;

FIG. 5 shows an actuation feature of the clutch assembly in a disengaged position; and FIG. 6 shows the actuation feature in the engaged position.

DETAILED DESCRIPTION OF THE INVENTION

Figure 4:
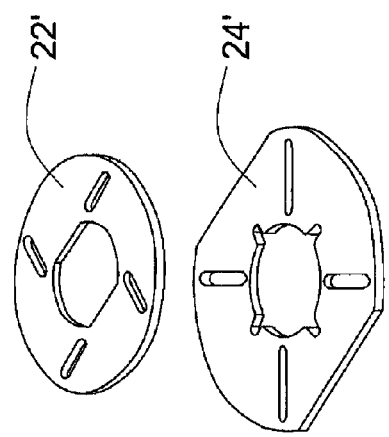
FIG. 4 illustrates alternative clutch plate designs.

FIG. 1 is a perspective view of an overload clutch assembly 10. The clutch assembly 10 acts between a shaft 12 and a housing 14. An engagement gear 16 or the like is rotatable with the housing 14. Also shown is a mounting plate 18 for suitably mounting the assembly.

Figure 3:
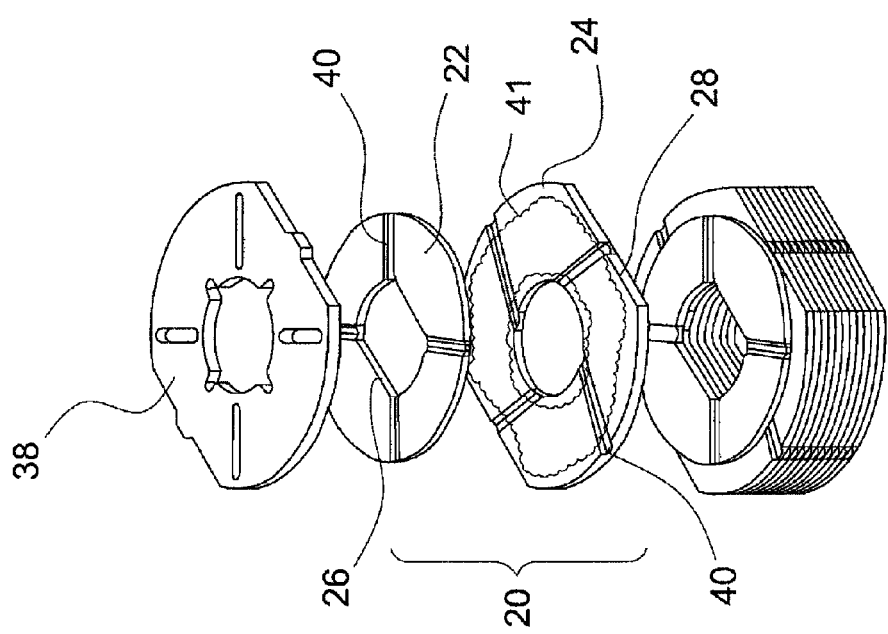
FIG. 3 is an exploded view showing an exemplary clutch plate or washer stack.

FIG. 2 is a cross-sectional view of the clutch assembly 10 through the housing 14. The clutch assembly 10 preferably includes a plurality of stacked clutch plates or washers 20 through which the shaft 12 is inserted. FIG. 3 is an exploded view of the stacked washers 20. The washers 20 include preferably alternating small plates 22 and large plates 24. The small plates 22 are keyed to the shaft 12 by a suitably shaped opening 26 through which the shaft 12 is inserted. The shaft 12 includes a bottom section 12a including key surfaces that engage the corresponding surfaces in opening 26. In this manner, the small plates 22 are rotated with rotation of the shaft 12.

The large plates 24 are keyed to the housing 14 by exterior key surfaces 28. The key surfaces 28 engage correspondingly shaped surfaces 14a within the housing 14.

With continued reference to FIG. 2, a cap member 30 is secured in the housing 14 preferably via a threaded connection and together with an O-ring 32 delimits an oil reservoir 34 within the housing 14. The housing 14 is closed at its bottom and thus contains oil in the oil reservoir 34. The cap member 30 includes a central opening 36 therein receiving a shaft 12. A compression spring 37 is disposed over the shaft 12 between the cap member 30 and a top plate 38 engaging the washer stack 20. A top plate 38 serves to distribute the spring force of the compression spring 37. The spring 37 acts on one regard to maintain a minimum compression force on the stacked washers 20.

As shown in FIG. 3, each of the small plate washers 22 and the large plate washers 24 includes one or more oil grooves 40 therein. Alternative configurations for the washer plates 22, 24 are shown in FIG. 4, referenced as 22', 24'. The oil grooves 40 serve to maintain a consistent film of oil 41 on the washer surfaces by permitting oil in the reservoir to flow between the washers and thereby access the washer surfaces. Of course, those of ordinary skill in the art will appreciate alternative designs and configurations for the washer plates, and the invention is not necessarily meant to be limited to the described and illustrated structure. For example, any other arrangement may be utilized to permit oil from the oil reservoir 34 to flow onto the washer surfaces such as via through holes, slots, notches, etc.

In use, as the shaft 12 is rotated, the housing 14 rotates, which in turn rotates the engagement gear 16. Upon the application of a torque exceeding a predetermined torque, the small plate washers 22 keyed to the shaft 12 will slip relative to the large plate washers 24 keyed to the housing 14. As such, the shaft 12 will continue to rotate while the housing 14 remains stationary.

A preferred material for the washers 22, 24 is hardened steel, which provides excellent consistency and robustness. The collection of materials is very lightweight compared to conventional clutch arrangement. Moreover, by immersing the washer stack 20 in an oil reservoir 34, the predetermined torque over which the clutch assembly 10 is activated is accurate and consistent regardless of environmental conditions, such as temperature, humidity, etc. as the characteristics of the oil do not vary significantly in different environmental conditions or over time. The consistency is provided by the metal against metal oil film engagement, which is not attainable with a rubber brake pad or the like against a metal rotor. Moreover, the performance of brake pads and similar rubber or synthetic products could vary considerably in different environmental conditions.

The specific predetermined torque can be set for a specific application and can be adjusted by adjusting a spring force of the spring 37, by changing the number of washers in the washer stack 20, or by adjusting a position of the cap member 30, e.g., via the threaded connection to the housing 14. A lower compression force by spring 37 reduces the predetermined torque, and a higher spring force increases the predetermined torque.

With the structure configured as described herein, a torque range for activation/deactivation of the clutch can be 15% or less. That is, assuming it is desirable for the shaft 12 to slip upon an application of 2.5 ft-lbs or higher, the structure described herein is consistent and accurate to ensure that a driving torque of 2.2 ft-lbs or lower will never activate the clutch, regardless of environmental conditions. This consistent but small window is beneficial in designing components in which the clutch assembly is incorporated.

Although the clutch assembly described herein is shown using a plurality or stack of washers 20, the assembly may function properly with as little as a single plate member against a bottom wall of the housing 14. The number of plate members/washers may be varied to vary the torque activation level and/or the weight of the assembly.

A second component of the clutch assembly will be described with reference to FIGS. 5 and 6. A stop plate 42 is coupled with a lower end of the housing 14 (see FIG. 2). The mounting bracket 18 includes a fixed member 44 to which the rotating plate 42 is selectively engageable. In an idle position (as shown in FIG. 6), a spring force 46 acting below the engagement gear 16 urges the shaft toward a retracted position where the rotating plate 42 engages the fixed member 44, thereby preventing rotation of the shaft 12. In order to free the rotating plate 42 from the fixed member 44, the operator is required to press down on the shaft 12 against the spring force 46 to clear the rotating plate 42 from the fixed member 44.

In the exemplary application to a mast lift described above, the shaft 12 may include an operating end 48 (FIG. 1) shaped to engage a motive power source. An exemplary motive power source is a hand-held power drill. In use, the power drill can be provided with a suitably-sized bit for engaging the shaft end 48. The user engages the power drill with the shaft end 48 and presses down on the shaft 12 to displace the shaft 12 from its retracted position (FIG. 6) to its extended position (FIG. 5). Subsequently, the user can activate the drill to rotate the shaft 12. Activation of the shaft 12 thus requires two independent actions, being press down and pull trigger. It is preferable that the two actions are performed simultaneously. It is further preferable that the shaft 12 be first pressed down as pulling the trigger without pressing down on the shaft 12 would activate the slip clutch assembly described above. In this manner, this provides a safety feature in the event the drill or other power source slips off the shaft 12 during use. Moreover, the use of two independent actions satisfies ANSI standard requirements.

An alternative arrangement in the exemplary mast lift application utilizes a power pack that is securable over the shaft. The power pack includes an internal source of motive power to rotate the shaft 12 according to an activation button or the like on the power pack. When the power pack is attached to the unit, the power pack displaces the shaft 12 to the extended position. The power pack itself may include a two-action activator such as a lever with a deadman switch or the like.

The clutch assembly described herein utilizes lightweight and inexpensive parts while performing accurately and consistently. The structure is robust and can withstand normal use over longer periods of time than with conventional assemblies. The clutch assembly enables efficient use of a hand-held power drill or the like to safely and efficiently provide a rotating force for a gear assembly while preventing damage due to overloading.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A slip clutch assembly including a slip clutch, a shaft and a housing, wherein the shaft and the housing are movably coupled with a mounting bracket, the slip clutch acting between the shaft and the housing, the slip clutch assembly comprising:
    an oil reservoir within the housing, the oil reservoir containing oil; and
    a plurality of stacked washers disposed in the oil in the oil reservoir and being alternately keyed to the shaft and the housing, each of the washers including an oil groove on one surface thereof, wherein the oil groove maintains a consistent film of oil on the washer surfaces,
    wherein the shaft and housing are displaceable relative to the mounting bracket by an axial load on the shaft, and wherein the stacked washers slip relative to one another such that the axially loaded shaft rotates relative to the housing upon an application of a predetermined torque.

2. A slip clutch assembly according to claim 1, further comprising a compression spring disposed within the housing, the compression spring acting to maintain a minimum compression force on the stacked washers.

3. A slip clutch assembly according to claim 2, further comprising a cap member secured in the housing, the cap member including a central opening therein receiving the shaft, wherein the compression spring is disposed surrounding the shaft between the cap member and the stacked washers.

4. A slip clutch assembly according to claim 3, wherein the cap member is threaded in the housing, and wherein the predetermined torque is adjustable according to a position of the cap member relative to the housing.

5. A slip clutch assembly according to claim 1, wherein the predetermined torque is adjustable according to a number of washers in the stacked washers.

6. A slip clutch assembly according to claim 1, wherein each of the washers comprises a plurality of oil grooves therein.

7. A slip clutch assembly including a slip clutch, a shaft and a housing, the slip clutch acting between the shaft and the housing, the shaft and housing being rotatable together up to a torque application on the shaft exceeding a predetermined torque after which the shaft rotates relative to the housing, the slip clutch assembly comprising:
    a first plurality of washers connected to the shaft and a second plurality of washers connected to the housing, the first and second pluralities of washers being immersed in an oil bath within the housing;
    a compression spring disposed within the housing, the compression spring acting to maintain a minimum compression force on the stacked washers regardless of an axial load on the shaft; and
    a cap member secured in the housing, the cap member including a central opening therein receiving the shaft, wherein the compression spring is disposed surrounding the shaft between the cap member and the stacked washers, and wherein the cap member is adjustable relative to the housing such that the predetermined torque is adjustable by adjusting a position of the cap member relative to the housing,
    wherein the washers comprise structure that maintains a consistent film of oil thereon.

8. A slip clutch assembly according to claim 7, wherein the first and second pluralities of washers are alternately keyed to the shaft and the housing.

9. A slip clutch assembly according to claim 7, wherein the structure that maintains a consistent oil film on the washers comprises at least one oil groove in the washers.

10. A slip clutch assembly according to claim 9, wherein each of the washers comprises a plurality of oil grooves therein.

* * * * *